United States Patent
Domine

(10) Patent No.: US 7,510,203 B2
(45) Date of Patent: Mar. 31, 2009

(54) HITCH RELEASE SYSTEM

(75) Inventor: Michael C. Domine, Summit, MS (US)

(73) Assignee: Towmaster, Inc., Litchfield, MN (US)

( * ) Notice: Subject to any disclaimer, the term of this patent is extended or adjusted under 35 U.S.C. 154(b) by 211 days.

(21) Appl. No.: 11/510,274

(22) Filed: Aug. 25, 2006

(65) Prior Publication Data

US 2007/0222185 A1    Sep. 27, 2007

Related U.S. Application Data

(60) Provisional application No. 60/777,650, filed on Feb. 28, 2006.

(51) Int. Cl.
*B62D 53/06* (2006.01)

(52) U.S. Cl. .................. 280/434; 172/439; 280/433; 280/477; 280/491.5; 280/507

(58) Field of Classification Search ............... 280/434, 280/433, 477, 491.5, 507; 172/439
See application file for complete search history.

(56) References Cited

U.S. PATENT DOCUMENTS

| | | | | |
|---|---|---|---|---|
| 2,441,710 A * | 5/1948 | Martin | ................. | 414/537 |
| 2,545,584 A * | 3/1951 | Meadows | ............. | 280/425.2 |
| 2,663,573 A * | 12/1953 | Shinn | ................. | 280/417.1 |
| 2,730,376 A * | 1/1956 | Martin | ................. | 280/425.2 |
| 2,850,292 A * | 9/1958 | Holland | ................. | 280/434 |
| 3,030,126 A * | 4/1962 | Martin | ................. | 280/425.2 |
| 3,918,744 A * | 11/1975 | Gay | ................. | 280/418.1 |
| 4,106,793 A * | 8/1978 | Neff | ................. | 280/435 |
| 4,484,760 A * | 11/1984 | Rach | ................. | 280/477 |
| 5,069,472 A * | 12/1991 | Parr et al. | ............. | 280/433 |
| 5,456,484 A | 10/1995 | Fontaine | | |
| 5,472,223 A * | 12/1995 | Hawthorne et al. | ...... | 280/437 |
| 5,641,174 A * | 6/1997 | Terry et al. | ............. | 280/434 |
| 6,272,949 B1 * | 8/2001 | Jarvis et al. | ............. | 74/569 |
| 6,402,176 B1 * | 6/2002 | Timmings | ............. | 280/433 |
| 6,520,527 B2 * | 2/2003 | Laarman | ............. | 280/437 |
| 7,384,056 B2 * | 6/2008 | Anderson | ............. | 280/441 |
| 2006/0255559 A1 * | 11/2006 | Abate et al. | ............. | 280/422 |

OTHER PUBLICATIONS www.towmastertrailers.com, Towmaster, Inc, Titanium Series Trailer, Nov. 2006.*

* cited by examiner

*Primary Examiner*—Paul N Dickson
*Assistant Examiner*—Patrick Centolanzi
(74) *Attorney, Agent, or Firm*—Patterson, Thuente, Skaar & Christensen, P.A.

(57) ABSTRACT

A hitch release system for releasing the locked engagement of a hitch, the hitch having a manually operable release bar coupled to a locking mechanism, the hitch release system includes a selectively actuatable power assist system, the power assist system being releasably, operably coupled to the release bar, wherein actuation of the power assist system acts to translate the release bar in a first axial direction, such translation acting to release the locking mechanism. A method of release is further included.

13 Claims, 11 Drawing Sheets

HITCH RELEASE SYSTEM

CROSS-REFERENCE TO RELATED APPLICATION

This application claims priority under 35 U.S.C. §119(e) to, and hereby incorporates by reference, U.S. Provisional Application No. 60/777,650, filed Feb. 28, 2006.

FIELD OF THE INVENTION

The invention relates generally to locking mechanisms for towing trailers. More specifically, invention relates to a power assisted release mechanism for locks on fifth wheel hitches.

BACKGROUND OF THE INVENTION

The towing of large capacity trailers requires rugged and robust lock mechanisms, such as those utilized by so-called "fifth wheel" units on semi tractors. Such locks typically include a depending king pin mounted on the trailer and a wedge receiver mounted on the tractor, having a king pin receiving slot defined in a load bearing plate and a locking mechanism. To connect a trailer to the tractor, the tractor is backed toward the trailer and the king pin rides into the slot and is captured therein by tripping the locking mechanism. See for example, U.S. Pat. No. 5,456,484. These locks are designed to endure the rigors of travel, as well as hitching and unhitching procedures, without compromising the integrity of the lock and introducing the danger of becoming unhitched during over-the-road operation.

Standard fifth wheel locking mechanisms feature a release that is actuated by manually pulling a release bar extending out one side of the fifth wheel unit. Due to the rugged design required of such locks, the pulling force required to release these locks can be quite high. Various factors (age, weather, extended periods of inactivity, etc.) may create a situation where the mechanism will "freeze" in the locked disposition and an operator cannot readily unlock the lock by manual means.

Some fifth wheel units are equipped with a powered mechanism that works independent of the manual release to unlock the fifth wheel, such as disclosed in U.S. Pat. No. 5,456,484. The power provided by these units overcomes many of the factors that would otherwise render a release manually impossible. However, such mechanisms are an integral part of the fifth wheel hitch unit, with components mounted underneath the load bearing plate. Components for such mechanisms tend to be custom made or specialized to stay within the footprint of the fifth wheel hitch unit. Moreover, acquiring the power assist release provided by these fifth wheel hitch units would require replacing the entire fifth wheel unit, rather than the more cost effective retrofitting of the existing fifth wheel hitch unit. A system is desired that avoids the expense of specialized components, and allows retrofitting of existing fifth wheel hitch units with a power assist system that also retains the manual unlock capability.

There are also known large capacity trailers that utilize a second fifth wheel hitch unit on the trailer itself, in addition to the fifth wheel hitch unit of the semi tractor. An example of such trailers is the TITANIUM™ Series of trailers manufactured by Towmaster, Inc. of Litchfield, Minn., the assignee and owner of the noted trademark. Referring to prior art FIGS. 1 and 2, a detachable gooseneck trailer 10 is portrayed. The trailer 10 is coupled to the tractor in the same manner as noted above. Further, these trailers have a gooseneck 12 that is detachable from a bed 14 in order to provide for the loading of very large vehicles on the bed from the front of the bed 14. Such trailers 10 include a second fifth wheel hitch unit as depicted at 16 of prior art FIG. 2. The fifth wheel hitch unit 16 is mounted to the bed 12. The fifth wheel hitch unit 16 provides for connections between a king pin mounted the gooseneck 12 and the bed 14. The fifth wheel hitch unit 16, in cooperation with other coupling means, couples the gooseneck 12 and the bed 14 as a unit, as depicted in prior art FIG. 1. As can be seen, access to both sides of the fifth wheel hitch unit 16 is somewhat restricted because of the framework of the bed 14, especially when the gooseneck 12 is coupled to the bed 14.

To facilitate release of the locking mechanism 17 of the fifth wheel hitch unit 16, an exemplary locking mechanism 17 (depicted in greater detail in FIGS. 11 and 12, includes a release bar 18 that extends through a support beam or framework 20 of the bed 14. An operator releases the locking mechanism 17 by pulling outward on the release bar 18 beyond the flange 21 of the framework 20. The king pin mounted on the gooseneck 12 is then free to slide forward in the king pin slot 19, thereby disengaging the gooseneck 12 from the bed 14. When the locking mechanism 17 is reset to the locked disposition, the tripping action of the king pin engaging the locking mechanism 17 causes the locking mechanism 17 to shift into the locked disposition automatically. Such action automatically retracts the release bar 18 back under the flange 21 of the framework 20. In this way, the release bar 18 serves as a visual indicator as to the status of the locking mechanism 17: if the release bar 18 is retracted, the operator knows the locking mechanism 17 is in the locked disposition; if the release bar 18 is extended, the operator knows the locking mechanism 17 is in the unlocked disposition.

It is common to utilize a fifth wheel hitch unit 16 for locking the gooseneck 12 to the bed 14. However, spatial constraints of certain trailer designs may preclude the use of existing power assisted fifth wheel units requiring a larger footprint to accommodate the power assist components. Also, many power assist units have manual release bars that are decoupled from the powered actuation train, which eliminates the benefit of a visual indication of the status of the lock. That is, a powered release of the locking mechanism 17 does not serve to extend the release bar 18 relative to the framework 20 of the bed 14, and an operator would have to verify setting of the locking mechanism 17 by other means. Hence, in addition to the desired traits enumerated above, there is a demand for a system that retains the visual indication provided by the manual release bar in a power assisted device and a device that can be selectively manually operated and power assist operated.

SUMMARY OF THE INVENTION

The various embodiments of the invention noted below substantially meet the needs noted above. The present invention provides a dual release locking system that can be operated both manually and by power assisted means such as hydraulics, pneumatics, or electric power. The various embodiments of the dual lock release system have a locking mechanism with a release bar that releases the locking mechanism when a tension force is applied to the release bar, whether that force is applied manually or by means of power assist.

A contact element is connected to the release bar that is coupled with a power assist actuator. In an embodiment, the actuator is in fluid communication with a release valve that isolates the actuator from a pressure source. A pilot valve and/or a regulator may also be included to control the fluid power system. The regulator allows the use of fluid components with a lower line pressure rating than supplied by the pressure source.

The pilot valve allows fluid power assist feature to be enabled or disabled in certain circumstances. The release bar is actuated by the power assist system by pivoting an arm about a pivot and engaging a contact element connected to the release bar, thereby exerting a tension force on the release bar to release the locking mechanism. The contact element is configured so that an operator can manually release the locking mechanism without reverse actuation of the pivoting arm and actuator.

The power assist system of the present invention may be located on a framework external to and spaced apart from the fifth wheel hitch unit or other hitch system that is actuated by the power assist system. This allows the use of standard off-the-shelf hydraulic or pneumatic components that are readily replaced, and does not require custom made components of specific size to fit within the footprint of a fifth wheel unit. It also provides ease of maintaining and servicing the power release system, and also provides more latitude in selecting replacement components, as the system can be adapted to accommodate larger or smaller replacement components.

Another advantage of various embodiments of the invention is that by being located on a framework external to and spaced apart from the fifth wheel hitch unit or other hitch system, the power assist system of the present invention can be readily and inexpensively retrofitted to an existing fifth wheel hitch unit or other lock mechanism. This avoids considerable expense by negating the need to replace the entire fifth wheel hitch unit or other hitch mechanism in order to incorporate a power assist unlocking mechanism.

Another advantage of specific embodiments of the invention is that the visual indication of the status of the lock is retained, even when the lock is not manually released. By acting directly on the manual release bar, the power assist system of the invention necessarily performs the same mechanical displacements of mechanical operation, thereby providing the same visual indication as to the status of the locking mechanism.

The present invention is hitch release system for releasing the locked engagement of a hitch, the hitch having a manually operable release bar coupled to a locking mechanism, the hitch release system includes a selectively actuatable power assist system, the power assist system being releasably, operably coupled to the release bar, wherein actuation of the power assist system acts to translate the release bar in a first axial direction, such translation acting to release the locking mechanism. The present invention is further a method of release of a hitch locking mechanism.

DETAILED SPECIFICATION

Figure 15:
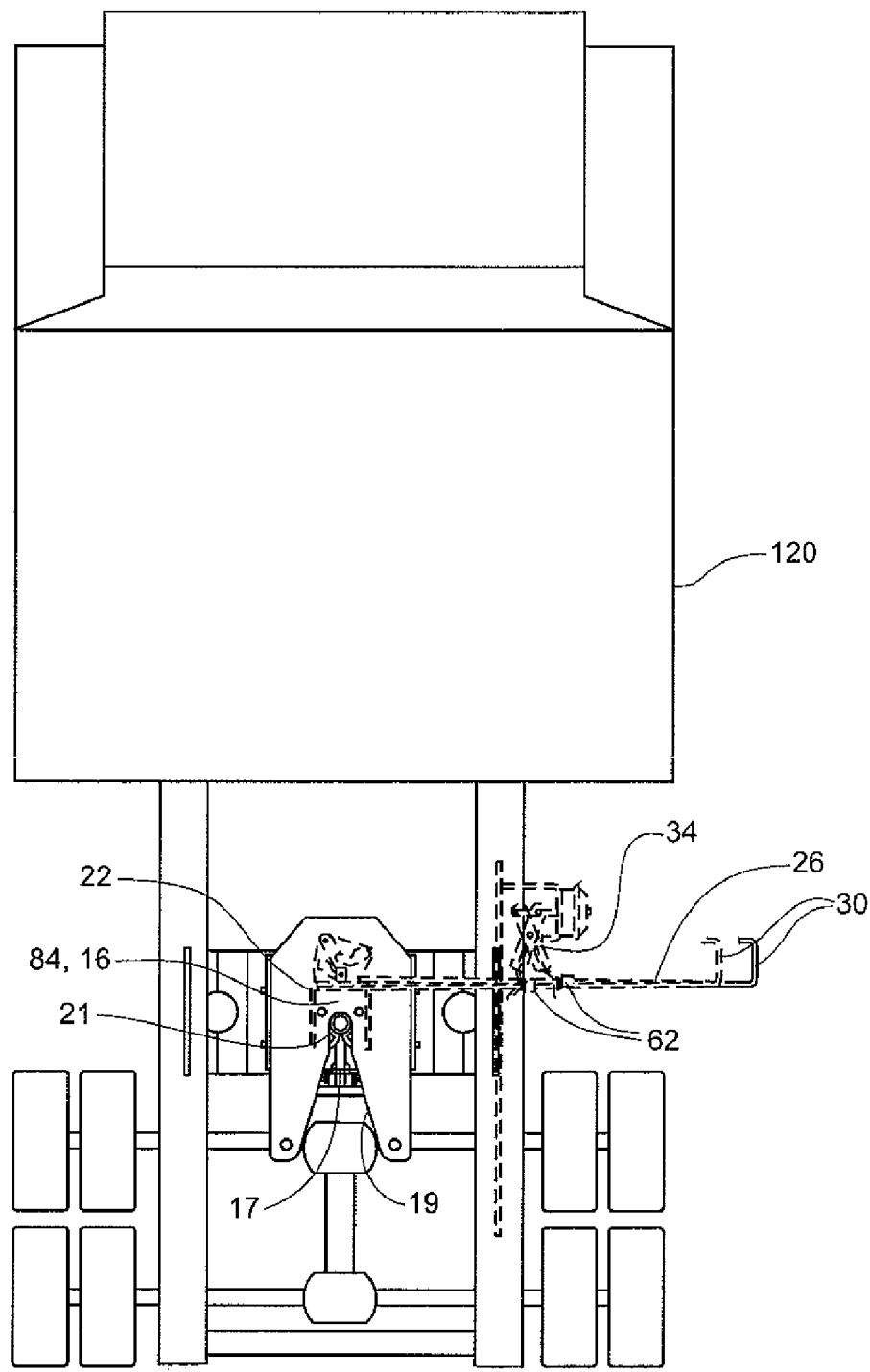
FIG. 15 shows a planviiew of the dual release system mounted on a semi truck tractor.

The power assist hitch release system of the present invention is shown generally at 22 in the figures. The hitch release system 22 may be further described as a power assisted dual release system. While the description below is directed to an exemplary fifth wheel hitch unit mounted on a detachable gooseneck trailer, it is clear that the power assist hitch release system of the present invention could as well be used in conjunction with an existing fifth wheel hitch unit, for example, mounted on a semi tractor 120 or in conjunction with a new fifth wheel hitch unit to be mounted on a semi tractor 120, as depicted in FIG. 15. Fifth wheel hitch units of a somewhat smaller size than those that are depicted here are typically used with pickup sized trucks to couple trailers, such as RV trailers, stock trailers and flatbed gooseneck trailers, to the pickup. A power assisted dual release system of the present invention that is of the same general construction, but of reduced capacity could as well be used with such fifth wheel hitch units. All of the above fifth wheel hitch units employ release bars, described in detail below, and all therefore are candidates for use with the hitch release unit 22 of the present invention.

Figure 1:
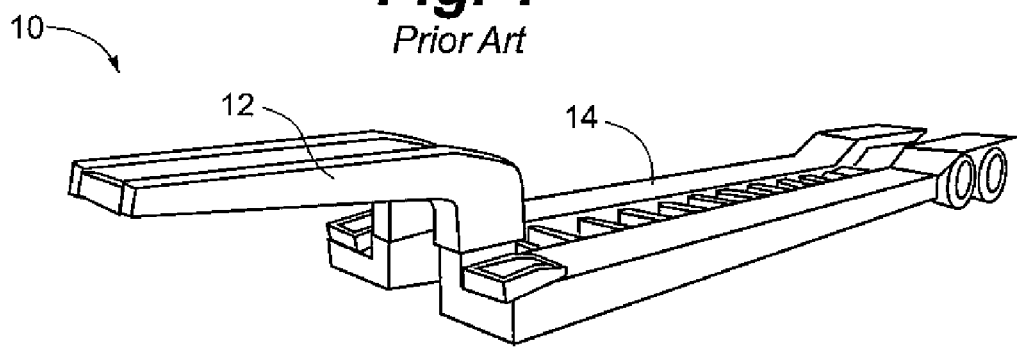
FIG. 1 shows an isometric view of a detachable gooseneck trailer.
Figure 2:
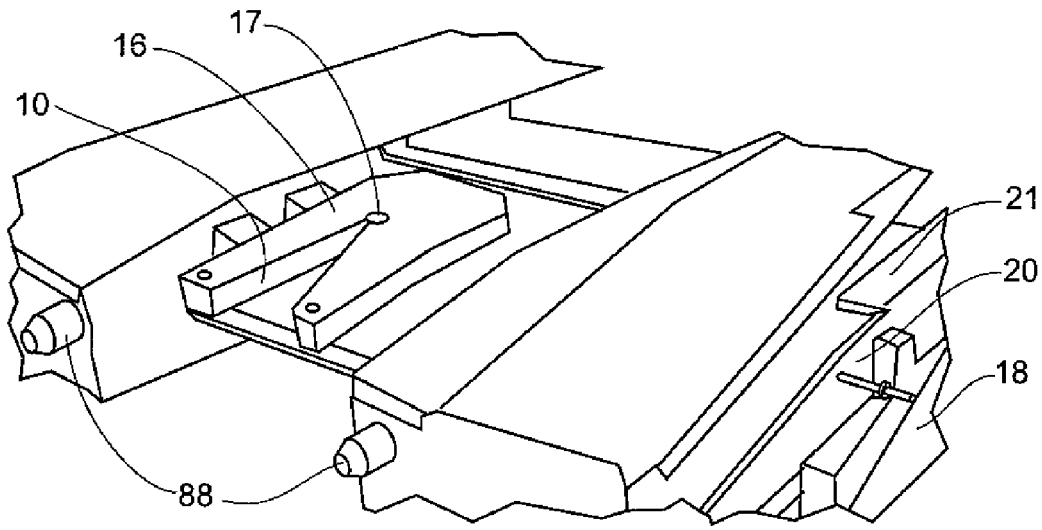
FIG. 2 shows a detachable gooseneck trailer with the gooseneck removed.
Figure 3:
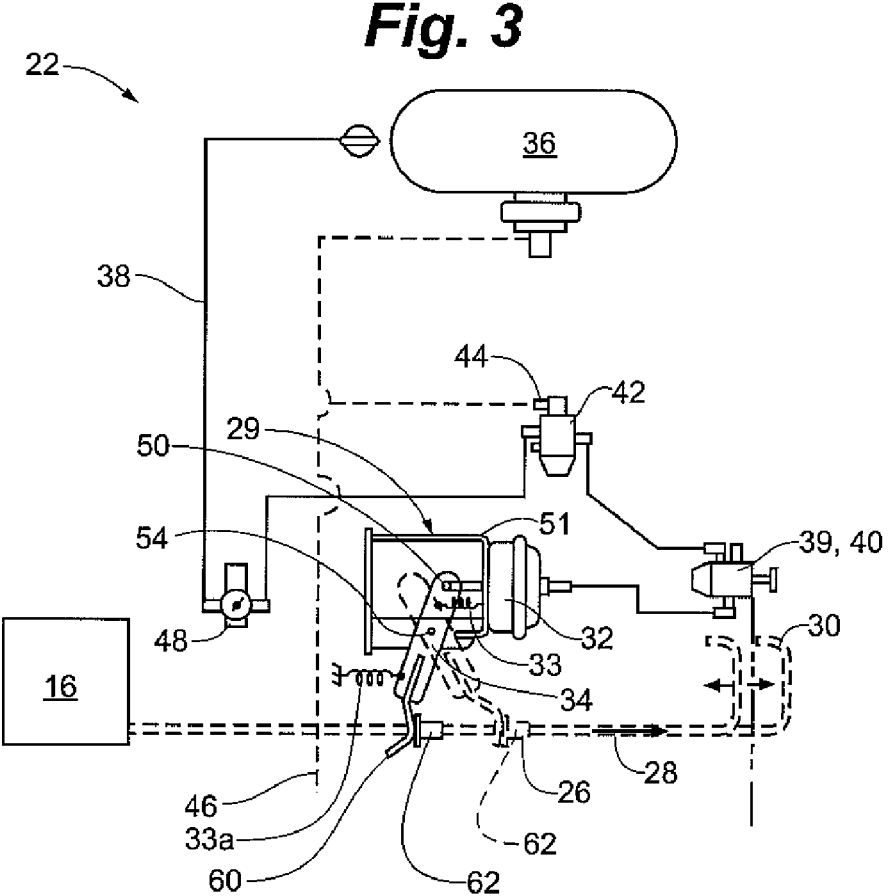
FIG. 3 shows an control schematic of the a pneumatic embodiment of the invention.

Referring to FIG. 3, a schematic of a first embodiment of the hitch release system 22 is shown. The hitch release system 22 acts on a prior art (FIG. 2) fifth wheel hitch unit 16, the fifth wheel hitch unit 16 including a locking mechanism 17 that is locked by a tripping action of a king pin contacting a known trip lock device (not shown) of the locking mechanism 17. The locking mechanism 17 is released (unlocked) by means of a release bar 26 connected to the locking mechanism 17. The locked disposition of the locking mechanism 17 is the leftmost position of the release bar 26, as depicted in FIG. 3. The unlocked disposition of the locking mechanism 17 is the rightmost position of the release bar 26, as depicted in FIG. 3. The locking mechanism 17 is released (or unlocked) by exerting a tension force on the release bar 26 that causes the release bar 26 to translate from the locked disposition to the unlocked disposition, as indicated by arrow 28. The requisite tension force may be applied either by manually pulling on a handle portion 30 located at the end of the release bar 26, or by a power assist system 29. The power assist system 29 includes a power assist actuator 32 that actuates the release bar 26 by means of a coupler. In this embodiment, the coupler is a pivoting arm 34. Such action withdraws a locking device (jaws 21 depicted in FIG. 11) from engagement with the king pin, thereby permitting the king pin to translate forward in the king pin slot 19.

The power assist actuator 32 of the power assist system 29 may be pneumatic, hydraulic or electric motor driven or a combination of those means of actuation. The power assist actuator 32 that is depicted in FIG. 3 is of the pneumatic type and is in fluid communication with a high pressure air source 36, such as an air tank or the tractor air brake system, through a pneumatic line 38 of suitable pressure rating. A manually actuatable switch 39, that in an embodiment is an air release valve 40, isolates the pneumatic actuator 32 from the high pressure air source 36. The air release valve 40 may be of the palm actuating type, wherein depression of the palm switch 40 causes air to pressurize the power assist actuator 32. See for example, the palm switch 40 depicted in FIG. 14. A biasing element, which may be a spring 33, is attached to the power assist actuator 32 for returning the pivot arm 34 and actuator 32 to the default (unpressurized) position once the actuation pressure to the pneumatic actuator 32 is vented. Alternatively, the biasing element may be a spring 33*a*, the spring 33*a* operating on the pivoting arm 34 for the same effect. The default (unpressurized) position is depicted in solid lines in FIG. 3, as noted above, and is the disposition that the hitch release system 22 is in when the locking mechanism 17 of the fifth wheel hitch unit 16 is in the locked disposition. The handle-portion 30 is in the retracted position and is easily viewed as such by an operator to confirm that the locking mechanism 17 is in the locked disposition.

The released (unlocked) disposition is shown by dashed lines in FIG. 3 and is the position of the dual hitch release system 22 when in the released (unlocked) disposition. Translating the release bar 26 to the right as indicated by the arrow 28 acts to unlock or release the locking mechanism 17 of the fifth wheel hitch unit 16.

An air pilot valve 42 may also be connected to the pneumatic line 38 between the high pressure air source 36 and the air release valve 40. The air pilot valve 42 is configured for normally-open operation and provides a safety enablement feature whereby the high pressure air source 36 is in communication with the air release valve 40 only when a high pressure source is not present on a pilot port 44 of the air pilot valve 42. The FIG. 3 embodiment shows the pilot port 44 in connection with an emergency brake air line 46. Brakes on semi tractors default to a mechanically biased, engaged, locked disposition when pneumatic pressure is diminished. Only by applying pneumatic pressure to the brakes are the brakes unlocked and the semi tractor is then free to move. It is clearly undesirable to release the locking mechanism 17 of the fifth wheel hitch unit 16 when the semi tractor is moving or able to move. Accordingly, by connecting the emergency brake air line 46 to the pilot port 44 of the air pilot valve 42, the air pilot valve 42 is disabled when pressure is supplied by the emergency air line, i.e. when the semi tractor is able to move. This arrangement provides a safety feature during over-the-road operation in that the high pressure air source 36 cannot communicate with the air release valve 40 while the semi tractor is in motion because of the presence of high pressure on the pilot port 44 of the air pilot valve 42.

Figure 4:
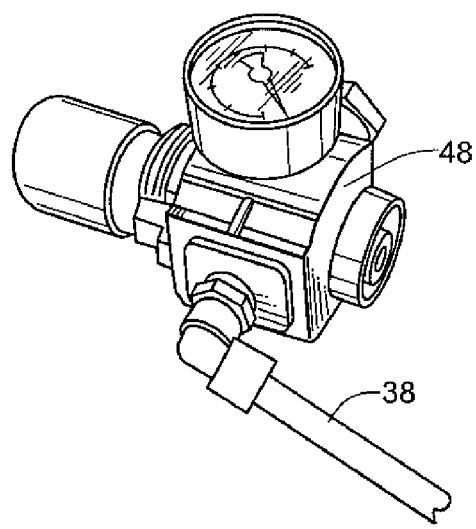
FIG. 4 shows a regulator in one embodiment of the invention.

An air pressure regulator 48, depicted in FIGS. 3 and 4, may also be placed between the high pressure air source 36 and the other components 32, 38, 40, and 42, to reduce the line pressure capacity requirements of these components 32, 38, 40, and 42. A somewhat reduced line pressure is adequate for the actuation of the release bar 26 and thereby minimizes the robustness (and size and cost) required in the various components 32, 38, 40, and 42.

Figure 3A:
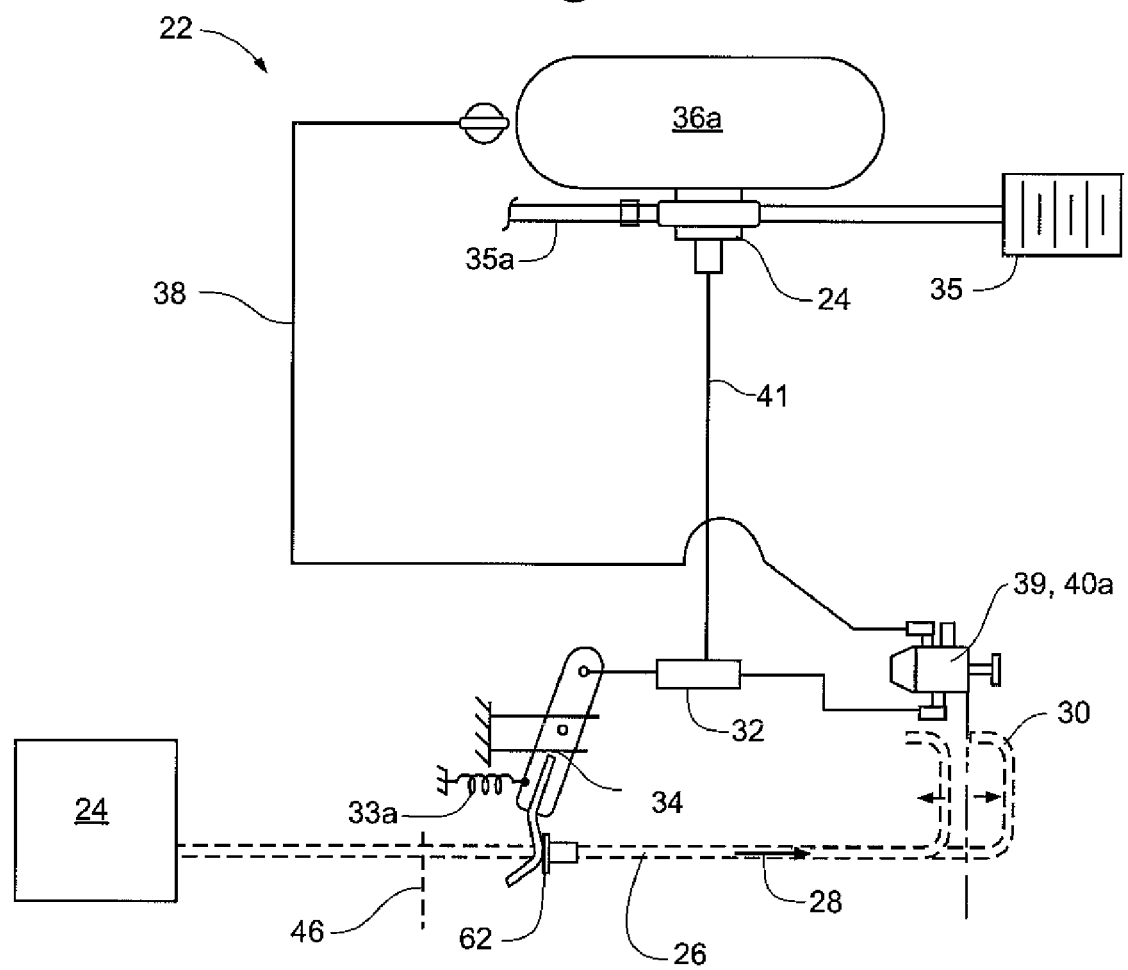
FIG. 3a shows an control schematic of the a hydraulic embodiment of the invention.

A further embodiment of the hitch release system 22 is depicted in FIG. 3*a*. The power assist actuator 32 depicted in FIG. 3*a* is of the hydraulic type and is in fluid communication with a high pressure hydraulic source 36*a*, such as a hydraulic reservoir. The reservoir 36*a* is pressurized by a hydraulic pump 24 that is preferably electrically powered from electric source 35. The hydraulic pump 24 may also be powered by an engine driven PTO shaft 35*a*. The reservoir 36*a* is in fluid communication with a hydraulic valve 40*a* through a hydraulic line 38*a*. The hydraulic valve 40*a* isolates hydraulic actuator 32*a* from the high pressure hydraulic source 36*a*. The hydraulic actuator 32*a* may be either a two way or a one way hydraulic cylinder. If a two way cylinder, a return line 41 returns hydraulic oil to the hydraulic pump 24. If a one way cylinder, the return line 41 may eliminated and oil is returned through line 38*a*. A biasing means, such as spring 33*a* is then required to return the pivot arm 34 to the leftward locked disposition. As above, the hydraulic valve 40*a* may be of the palm actuating type, wherein depression of the palm switch causes hydraulic oil to pressurize the hydraulic actuator 32*a* and retraction of the valve 40*a* causes a two way hydraulic cylinder to retract, returning release bar 26 to the locked disposition depicted. See for example, FIG. 14.

Figure 3B:
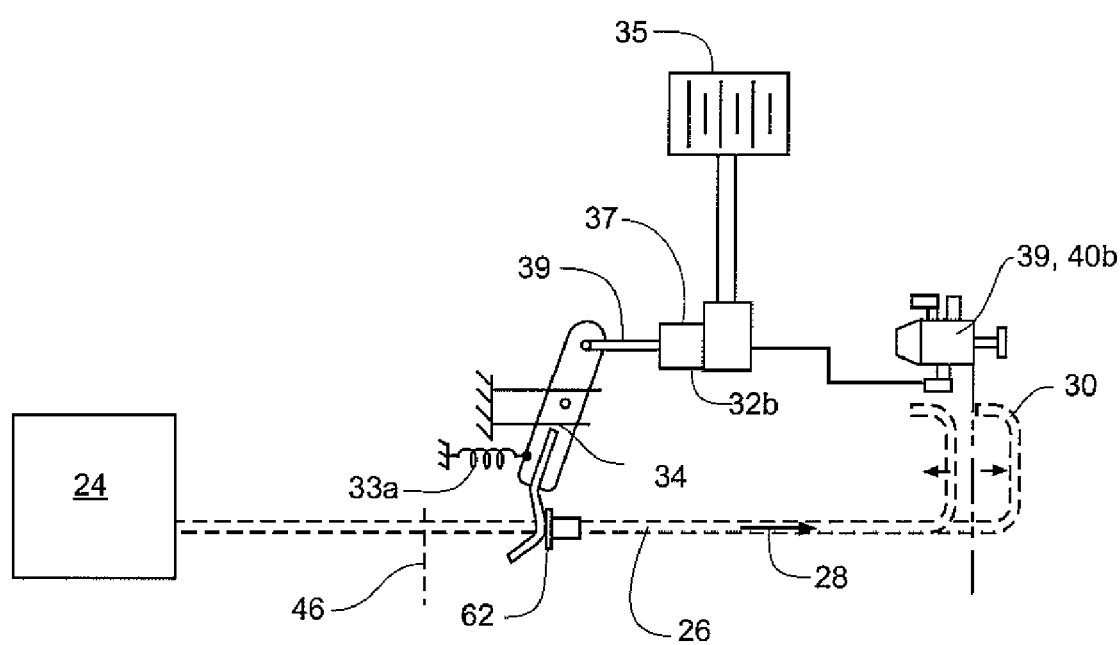
FIG. 3b shows an control schematic of the an electric embodiment of the invention.

In another embodiment, the power assist actuator 32*b* depicted in FIG. 3*b* is of the electric type and is in electric communication with an electric source 35. An electric motor 32*b* is controlled by actuation of an electric switch 40*b*. Actuation of the switch 40*b* in a first direction actuates the electric motor 32*b* in a first rotational direction to power the release bar 26 to the unlocked released disposition as indicated by the arrow 28. Actuation of the switch 40*b* in a second direction actuates the electric motor in an opposite second rotational direction to power the pivot arm 34 to return to the depicted neutral locked disposition. The electric motor 32*b* may act through a gearbox 37. The gearbox 37 acts to effect translation of the shaft 39 in an opposite direction to the arrow 28 to effect translation of the release bar 26 in the direction of the arrow 28.

Figure 5:
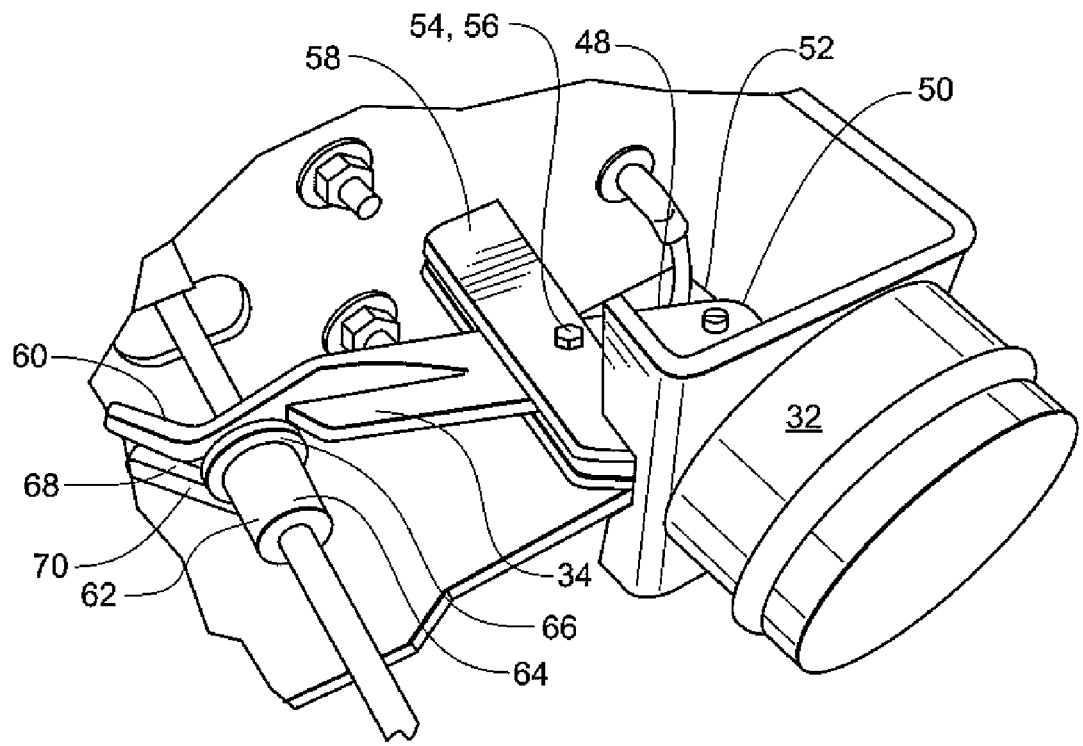
FIG. 5 shows an actuator, pivoting arm and contact element according to an embodiment of the invention.
Figure 6:
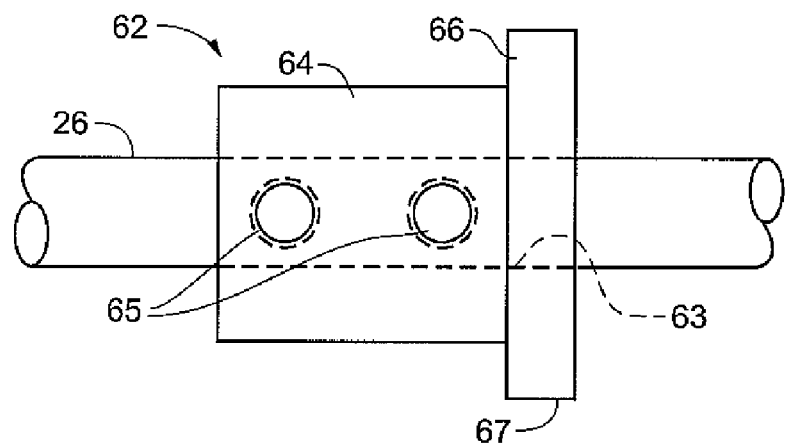
FIG. 6 shows an embodiment of a contact element of the invention.
Figure 7:
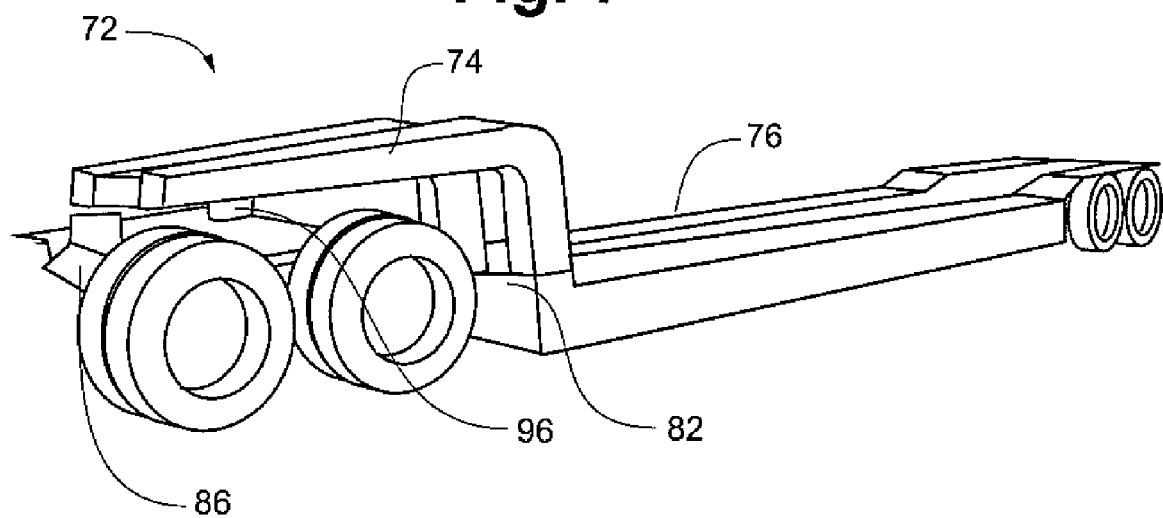
FIG. 7 shows a detachable gooseneck trailer according to the invention.
Figure 8:
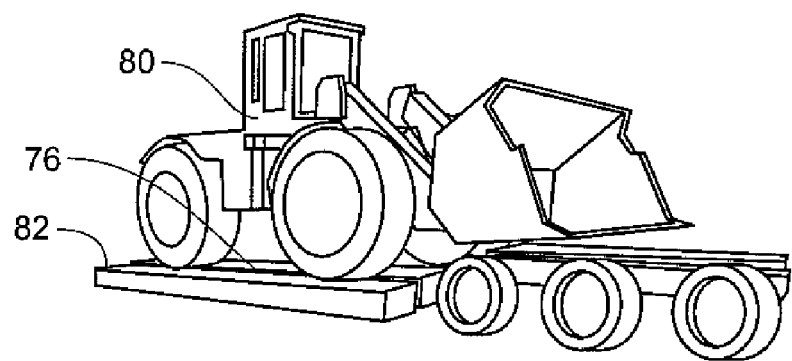
FIG. 8 shows a detachable gooseneck trailer according to an embodiment of the invention with the gooseneck removed and payload placed thereon.

Referring to FIGS. 3, 5 and 6, the workings of the pivoting arm 34 are described in more detail. A proximate end portion 48 of the pivoting arm 34 is connected to the stem 51 of the pneumatic actuator 32 by a linkage 50 that is held in place by a cotter pin 52. A pivot 54 is provided on the pivoting arm 34 in the form of a hex cap screw 56 that passes through bores in registry defined in a support 58 and in the pivoting arm 34, with clearance between the cap screw 56 and the pivoting arm 34 being sufficient to allow the pivoting arm 34 to pivot freely about the cap screw 56.

A distal end portion 60 of the pivoting arm 34 is shown in engagement with a contact element 62 that is fastened to the release bar 26. The particular contact element 62 shown is in the form of a bushing 64 having a collar 66. The contact element 62 has an axial bore 63 therethrough for receiving the release bar 26 therein. The contact element 62 is affixed to the release bar 26 with set screws 65, as depicted in the diagram of FIG. 6. (A skilled artisan may choose some other form for the contact element or fastening, such as a bolt or pin passing through the release bar 26, held in place by a cotter pins, or tack welding a contact element to the release bar 26.) The distal end portion 60 of the pivoting arm 34 is configured with a forked slot 68 through which the release bar 26 passes. The slot 68 allows the pivoting arm 34 to rotate without displacing the release bar 26 in a radial direction or otherwise without interfering with axial movement of the release bar 26.

The distal end 60 of the pivoting arm 34 features a contoured surface 70 that acts as a cam that maintains uniform sliding contact on the face 67 of the bushing 64 of the collar 62 as the pivoting arm 34 travels through the full range of its angular rotation. The pivoting arm 34 is slidably, selectively engaged only with the contact element 62. It is understood that for the dual action of both manual release and power assisted release, the pivoting arm 34 must be free to disengage from the contact element 62. The release bar 26 therefore must be able to pass freely through the forked slot 68 in either axial direction, a first axial direction being indicated by arrow 28.

The collar 62 is positioned on the release bar 26 so that the pivoting arm 34 is between the locking mechanism 17 of FIG. 3 and the bushing 64. That is, the bushing 64 is located on the same side of the pivoting arm 34 as the handle portion 30 (FIG. 3) of the release bar 26. In this way, when the release bar 26 is manually actuated, the bushing 64 pulls away from the pivoting arm 34, and does not require the operator to overcome the forces associated with reverse actuation of the pivoting arm 34 and the pneumatic actuator 32.

Referring to FIGS. 7 through 10, the hitch release system 22 is shown in the context of a detachable gooseneck trailer 72. The detachable gooseneck trailer 72 has a gooseneck 74 that is detachable from a bed 76, depicted attached in FIG. 7 and detached in FIGS. 8 and 9. The detached bed 76 provides for minimal ground clearance at front end 82 (see FIG. 8) to accommodate the ready loading of payloads of large machinery 80 or other tall objects. Such machinery 80 must be transported as low as possible to avoid exceeding maximum overhead clearance requirements for transport under overpasses and power lines.

To load the machinery 80, the gooseneck 74 is detached from the front end 82 of the bed 76 and the machinery 80 is driven onto the bed 76 from the front end 82, usually with the assistance of fold down ramps 83. The gooseneck 74 is subsequently reattached and locked onto the trailer bed 76 using a fifth wheel hitch unit 16 as a coupling mechanism 84. The reattachment is accomplished by backing a semi tractor 86 supporting the gooseneck 74 up to the bed 76, as depicted in FIGS. 9 and 10 and engaging a depending kingpin (not shown) on the gooseneck 74 with the fifth wheel hitch unit 16.

Figure 9:
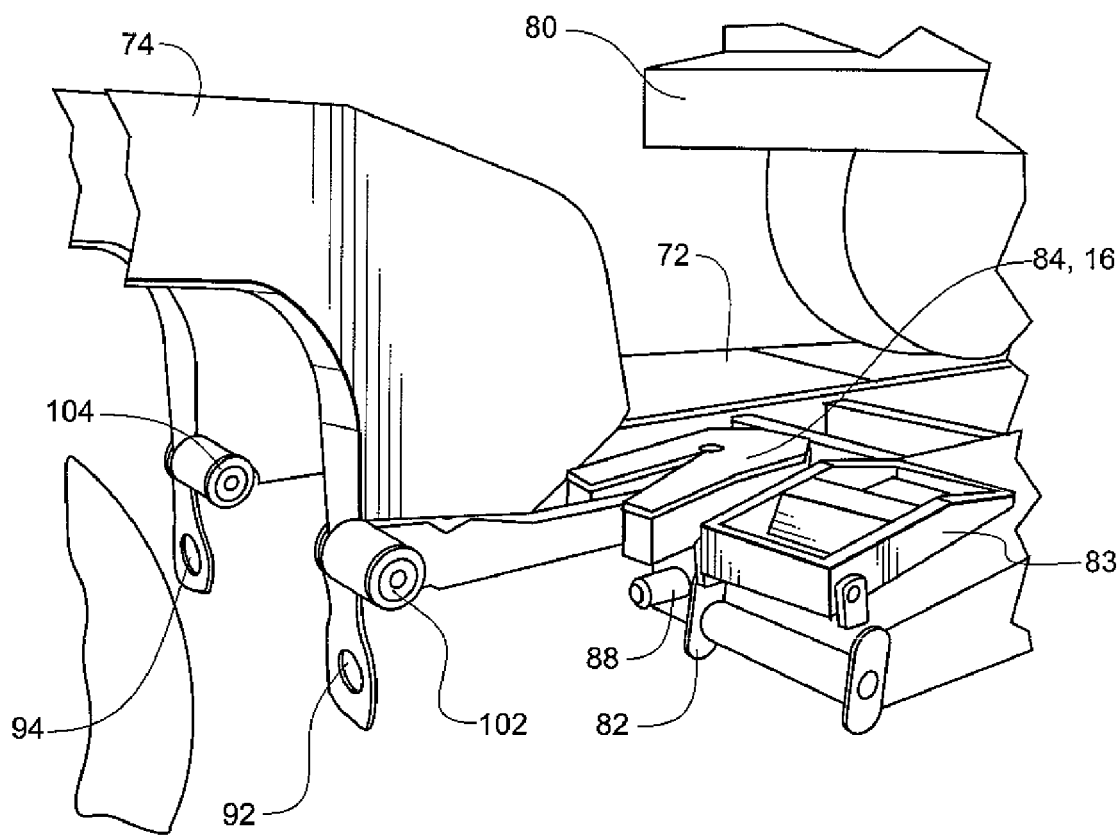
FIG. 9 shows a detached gooseneck and trailer in an embodiment of the invention.

When attached, the weight load of the front end 82 of the bed 76 is borne by two load pins 88, as depicted in FIGS. 2 and 9. The load pins are coupled through eyes 92 and 94 depending from the gooseneck 74. Accordingly, the coupling mechanism 84 on the detachable gooseneck trailer 72 may be that of a standard fifth wheel hitch unit 16, but the coupling mechanism 84 is not required to perform all the normal functions of a fifth wheel hitch unit 16 on the semi tractor 86, because, unlike the fifth wheel hitch unit 16 on the tractor 86, the coupling mechanism 84 does not bear the weight load of the trailer 72, nor does the coupling mechanism 84 have to accommodate rotation between the semi tractor 86 and the trailer 72 during turns.

Figure 10:
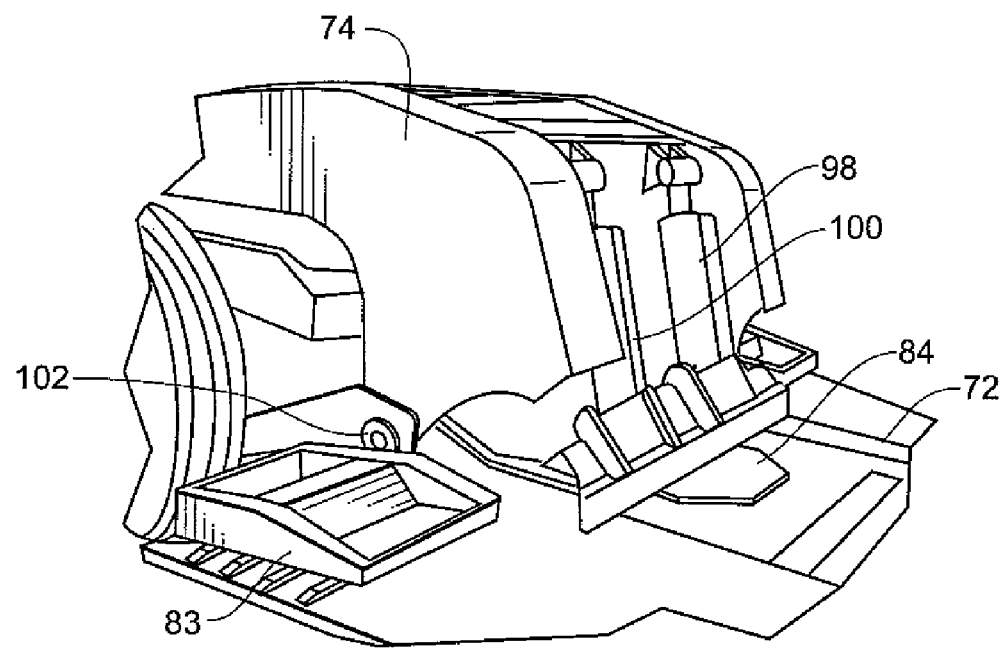
FIG. 10 shows a gooseneck mounted to the a trailer in accordance with an embodiment of the invention.

The gooseneck 74 is fitted with two hydraulic cylinders 98 and 100 that exert a downward force on the trailer bed 76, as shown in FIG. 10. The downward force cooperates with the load pins 88 and 90 to cause the gooseneck 74 to rotate away from the bed 76 about a pair of hinge pins 102 and 104 located on the gooseneck 74. The rotation causes the front end 82 of the bed 76 to rise off the ground during coupling operations of the gooseneck 74 and the trailer bed 76.

Figure 11:
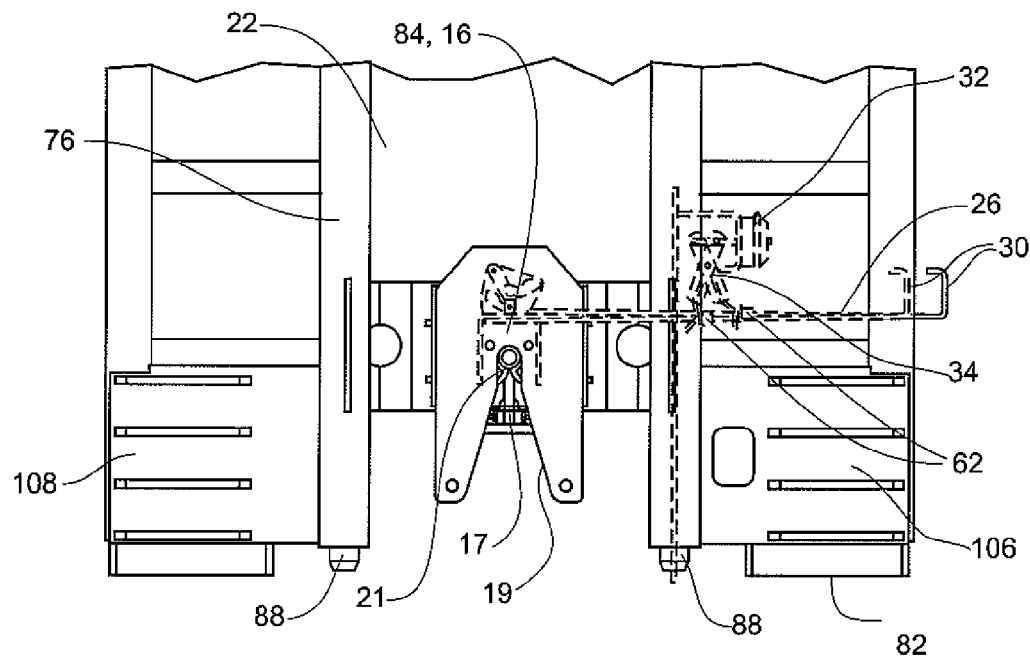
FIG. 11 shows a plan view of an embodiment of a dual release system of the invention.
Figure 12:
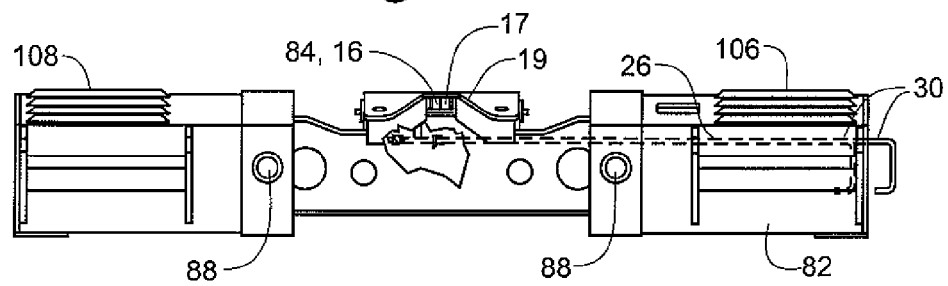
FIG. 12 shows an elevation view of an embodiment of a dual release system of the invention.
Figure 13:
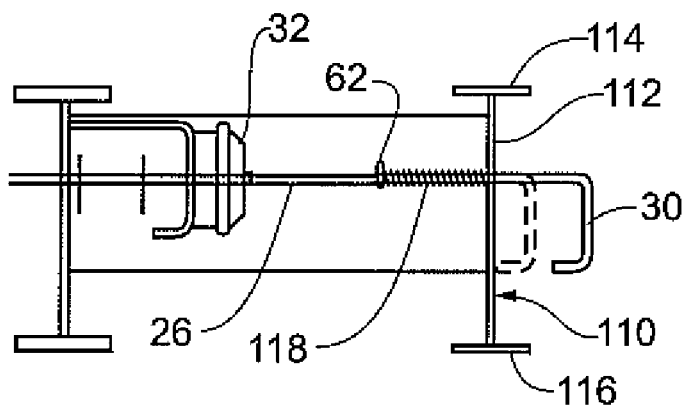
FIG. 13 shows a plan view of an embodiment of a dual release system of the invention.

Referring to FIGS. 11 through 15, the particular mechanical layout of the hitch release mechanism 22 is shown. FIGS. 11 through 13 depict the layout within the bed 76 of the detachable gooseneck trailer 72. It should be noted that similar layouts may be readily adapted to the other fifth wheel hitch units 16 noted above, including the tractor 120 of FIG. 15. The coupling mechanism 84 is located between two ramps 106 and 108 that augment loading and unloading of payload. The release bar 26 extends through a side rail beam 110 on the left side of the detachable gooseneck trailer 72. FIGS. 11 through 13 depict the release bar 26 in both a leftward locked, retracted and a rightward release, extended position. FIG. 11 particularly depicts the hitch release mechanism 22 in a spaced apart relationship with respect to the fifth wheel hitch unit 16, mounted external to the fifth wheel hitch unit 16. It should be noted that no modification to the fifth wheel hitch unit 16 as such is required, other than the releasable coupling to the release bar 26, in order to retrofit the existing fifth wheel hitch unit 16 with the hitch release mechanism 22.

Figure 14:
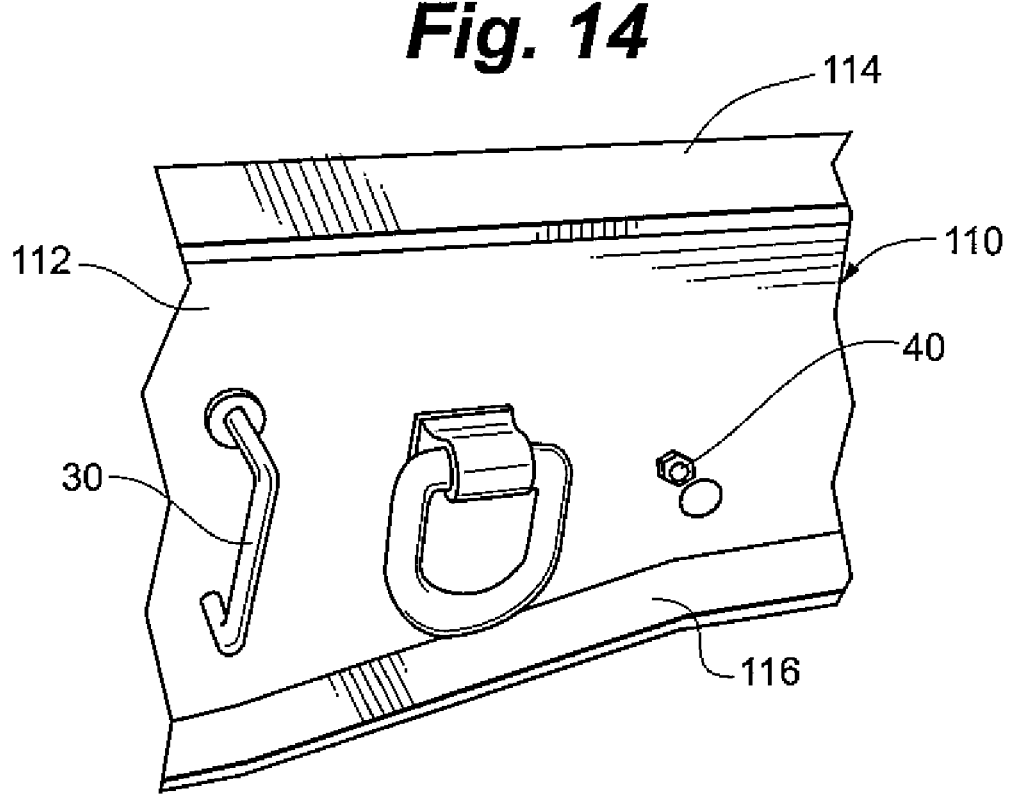
FIG. 14 shows an operator interface of an embodiment of the dual release system according to the invention.

FIG. 14 shows the operator's interface with the manual release handle portion 30 and the air release valve 40 located on the side rail beam 110. The retracted position occurs when the locking mechanism 17 of the fifth wheel hitch 16 is engaged, and the extended position occurs when the lock is disengaged, either manually or by power assist actuation. When in the retracted position, the handle portion 30 of the release bar 26 is tucked in close to the web 112 of the side rail beam 110, effectively between the upper and lower flanges 114 and 116 of the side rail beam 110. A biasing element 118 such as a spring 33 may be connected between the release bar 26 and the side rail beam 110 to assist in the return of the pivoting arm 34 when the power assist actuator 32 is unpowered. The spring 33 is in a concentric arrangement with the release bar 26. The biasing element 118, being held in compression between the contact element 62 and the inner margin of the web 112 of beam 110, exerts a force on the pivoting arm 34 through the contact element 62 that is opposite to the arrow 28.

When the release bar 26 is in the rightward, extended position, the handle portion 30 is noticeably away from the web 112, extending out beyond the edges of the flanges 114 and 116. In this way, an operator can check the locked/unlocked status of the locking mechanism 17. Accordingly, if the handle portion 30 is retracted, the locking mechanism 17 is engaged. If the handle portion 30 is extended, the locking mechanism 17 is disengaged or released. Moreover, the position of the handle is readily viewed through the rear view mirror of the semi tractor 86. This allows the operator to finally check whether the locking mechanism 17 is engaged before pulling away, or to confirm that the locking mechanism 17 is not engaged before detaching or reattaching the gooseneck 74.

It is noted that certain embodiments of the invention lend itself to hydraulic rather than pneumatic actuation. The disclosures above show that semi tractors are typically equipped with hydraulic supplies systems. Therefore, one skilled in the art of semi trailer coupling will recognize that the power assist concept of the invention is readily implemented by the use of hydraulic instead of pneumatic components, or a combination thereof. For example, one could utilize a release valve that delivers pressure to a hydraulic actuator from a hydraulic source rather than a pneumatic actuator communicating with a pneumatic source. Yet the pilot valve that enables a hydraulic source could still be pneumatically enabled, thereby retaining the advantage of being operable only when the emergency brake source is pressurized.

While the particular embodiments presented and discussed in detail above are fully capable of providing the advantages stated, it is to be understood that they are merely illustrative of the invention. Various other modifications and changes with which the invention can be practiced and which are within the scope of the description provided herein will be readily apparent to those of ordinary skill in the art.

The invention claimed is:

1. A hitch release system for releasing the locked engagement of a hitch, the hitch having a manually operable release bar coupled to a locking mechanism for mounting on a vehicle, the hitch release system comprising:
a selectively actuatable power assist system, the power assist system being releasably, operably coupled to the release bar for effecting translation thereof in a selected axial direction, the power assist system being spaced apart from the hitch, the power assist system being releasably, operably coupled to the release bar by a coupler, the release bar being free to translate axially with respect to the coupler when the release bar is manually actuated, the coupler being a pivotable arm, the pivotable arm having a forked, cammed engaging portion.

2. The hitch release system of claim 1, wherein actuation of the power assist system acts to translate the release bar in a first axial direction, such translation acting to release the locking mechanism.

3. The hitch release system of claim 1, the power assist system being releasably, operably coupled to the release bar by a coupler, the release bar being free to translate axially with respect to the coupler when the release bar is manually actuated.

4. The hitch release system of claim 3, the power assist system being selectively pneumatically, hydraulically, electrically, or pneumatically/hydraulically actuatable.

5. The hitch release system of claim 1, the power assist system including a power assist actuator, the actuator being operably coupled to a pivot arm, the pivot arm being operably coupled to the release bar.

6. The hitch release system of claim 1, the power assist system including a manually actuatable switch being operably coupled to a power assist actuator for selectively actuating the power assist actuator.

7. The hitch release system of claim 1, including a biasing element, the biasing element acting on the release bar to bias the release bar in a locked disposition.

8. A hitch release system for releasing the locked engagement of a hitch, the hitch having a manually operable release bar coupled to a locking mechanism and being mounted on a vehicle, the hitch release system comprising:
a pneumatically actuatable power assist system, the power assist system being releasably, operably coupled by means of a coupler to the release bar, wherein actuation of the power assist system acts to translate the release bar in a first axial direction by means of a pivotable arm, such translation acting to release the locking mechanism, the coupler being a pivotable arm, the pivotable arm having a forked, cammed engaging portion.

9. The hitch release system of claim 8, the power assist system being releasably, operably coupled to the release bar by the pivotable arm, the release bar being free to translate axially with respect to the pivotable arm when the release bar is manually actuated.

10. The hitch release system of claim 9, the power assist system including a power assist actuator, the actuator being operably coupled to the pivot arm, the pivot arm being operably coupled to the release bar.

11. The hitch release system of claim 8, the power assist system including a manually actuatable switch being operably coupled to a power assist actuator for selectively actuating the power assist actuator.

12. The hitch release system of claim 8, including a biasing element, the biasing element acting on the release bar to bias the release bar in a locked disposition.

13. A hitch release system for releasing the locked engagement of a hitch, the hitch having a manually operable release bar coupled to a locking mechanism and being mounted on a vehicle, the hitch release system comprising:
a pneumatically actuatable power assist system the power assist system being releasably, operably coupled to the release bar, wherein actuation of the power assist system acts to translate the release bar in a first axial direction, such translation acting to release the locking mechanism, the power assist system being releasably, operably coupled to the release bar by a coupler, the release bar being free to translate axially with respect to the coupler when the release bar is manually actuated, the coupler being a pivotable arm, the pivotable arm having a forked, cammed engaging portion.

* * * * *